US011386115B1

(12) United States Patent
Raghavan et al.

(10) Patent No.: US 11,386,115 B1
(45) Date of Patent: Jul. 12, 2022

(54) SELECTABLE STORAGE ENDPOINTS FOR A TRANSACTIONAL DATA STORAGE ENGINE

(71) Applicant: Amazon Technologies, Inc., Reno, NV (US)

(72) Inventors: Srinivasan Sundar Raghavan, Mercer Island, WA (US); Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1310 days.

(21) Appl. No.: 14/485,003

(22) Filed: Sep. 12, 2014

(51) Int. Cl.
*G06F 16/00* (2019.01)
*G06F 16/27* (2019.01)
*H04L 67/1097* (2022.01)

(52) U.S. Cl.
CPC .......... *G06F 16/27* (2019.01); *H04L 67/1097* (2013.01)

(58) Field of Classification Search
CPC .. G06F 17/30575; G06F 16/27; G06F 16/178; H04L 67/1097
See application file for complete search history.

(56) References Cited

U.S. PATENT DOCUMENTS

| 6,304,881 | B1 | | 10/2001 | Halim et al. | |
|---|---|---|---|---|---|
| 7,979,652 | B1 | * | 7/2011 | Sivasubramanian | G06F 11/2094 711/141 |
| 7,984,043 | B1 | * | 7/2011 | Waas | G06F 16/2471 707/718 |
| 8,468,132 | B1 | * | 6/2013 | O'Neill | G06F 17/30212 707/622 |
| 8,554,762 | B1 | * | 10/2013 | O'Neill | G06F 17/30575 707/715 |
| 8,775,663 | B1 | * | 7/2014 | Singh | H04L 67/2828 709/227 |
| 9,053,167 | B1 | * | 6/2015 | Swift | G06F 16/27 |
| 9,569,513 | B1 | * | 2/2017 | Vig | G06F 17/30575 |
| 9,633,051 | B1 | * | 4/2017 | Maccanti | G06F 11/1464 |
| 10,917,471 | B1 | * | 2/2021 | Karumbunathan | H04L 67/1097 |
| 2007/0168583 | A1 | * | 7/2007 | Kim | G06F 13/385 710/56 |
| 2008/0195833 | A1 | * | 8/2008 | Park | G06F 3/0679 711/E12.001 |
| 2009/0049443 | A1 | * | 2/2009 | Powers | G06F 9/505 718/100 |
| 2011/0099146 | A1 | * | 4/2011 | McAlister | G06F 11/3006 707/634 |

(Continued)

*Primary Examiner* — Noosha Arjomandi
(74) *Attorney, Agent, or Firm* — Robert C. Kowert; Kowert, Hood, Munyon, Rankin & Goetzel, P.C.

(57) ABSTRACT

A transactional data storage engine may implement selectable storage endpoints. A selection of storage endpoints may be received at a transactional data storage engine. The selected storage endpoints may identify storage locations maintaining replicas of data for the transactional data storage engine. A storage engine configuration for the transactional data storage engine may be updated to include the storage endpoints so that access requests for the data may be sent to storage endpoints identified according to the storage engine configuration. In some embodiments, storage endpoints may identify strongly consistent or eventually consistent storage locations for performing reads of the data maintained for the transactional data storage engine.

20 Claims, 9 Drawing Sheets

(56) References Cited

U.S. PATENT DOCUMENTS

| | | | |
|---|---|---|---|
| 2011/0099420 A1* | 4/2011 | MacDonald McAlister | G06F 11/2025 714/6.32 |
| 2011/0145723 A1 | 6/2011 | Walsh et al. | |
| 2011/0184915 A1* | 7/2011 | Wu | G06F 16/27 707/674 |
| 2012/0158805 A1* | 6/2012 | Andre | G06F 16/24552 707/827 |
| 2012/0166390 A1* | 6/2012 | Merriman | G06F 11/1458 707/613 |
| 2013/0036272 A1 | 2/2013 | Nelson | |
| 2013/0054757 A1* | 2/2013 | Spitz | G06Q 30/0251 709/219 |
| 2013/0054889 A1* | 2/2013 | Vaghani | G06F 3/067 711/E12.001 |
| 2013/0290249 A1* | 10/2013 | Merriman | G06F 16/278 707/610 |
| 2013/0311597 A1 | 11/2013 | Arrouye et al. | |
| 2013/0339302 A1* | 12/2013 | Zhang | G06F 16/128 707/649 |
| 2013/0339643 A1* | 12/2013 | Tekade | G06F 11/1451 711/162 |
| 2014/0006731 A1* | 1/2014 | Uluski | G06F 3/0604 711/155 |
| 2014/0149400 A1* | 5/2014 | Fu | G06F 17/30575 707/723 |
| 2014/0244581 A1* | 8/2014 | Rath | G06F 16/27 707/623 |
| 2014/0258507 A1 | 9/2014 | Lubrano | |
| 2014/0324785 A1* | 10/2014 | Gupta | G06F 16/273 707/689 |
| 2014/0325170 A1* | 10/2014 | Aswathanarayana | G06F 9/45558 711/162 |
| 2015/0169716 A1* | 6/2015 | Franklin | G06F 16/27 707/610 |
| 2015/0177994 A1* | 6/2015 | Vucinic | G06F 12/08 711/103 |
| 2015/0261443 A1* | 9/2015 | Wei | G06F 16/27 711/162 |
| 2015/0370767 A1* | 12/2015 | Sevilmis | G06F 17/30575 715/255 |
| 2016/0127200 A1* | 5/2016 | Dippenaar | G06F 16/183 709/224 |
| 2017/0262551 A1* | 9/2017 | Cho | G06F 16/285 |

* cited by examiner

SELECTABLE STORAGE ENDPOINTS FOR A TRANSACTIONAL DATA STORAGE ENGINE

BACKGROUND

Applications may rely upon storage engines to manage data stored for the use of an application. For example, an application may embed a database storage engine to get data from or put data into a database that tracks information for the application (e.g., as part of implementing a game or software tool on a mobile device). As many types of these applications may interact with or utilize data differently, the ways in which data may be stored vary. Data may be distributed and/or replicated across multiple storage locations for several reasons, including security issues, disaster prevention and recovery issues, performance, data locality and availability issues. As the complexity of such storage arrangements increases, applications may increasingly bear the cost and complexity of accessing the data in different locations.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement selectable storage endpoints for transactional data storage engines, according to some embodiments. Transactional data storage engines provide data management for clients in a predictable and consistent way. Updates and other access requests to underlying data managed by the transactional data storage engines may be submitted to a storage device which may in turn service the request. In order to safeguard data from failure and other loss scenarios multiple copies or replicas of data may be maintained. However, transactional storage engines typically access a particular copy of data and may be unaware of other replicas of the data, shifting the burden to ensure durability and consistency of data to an application utilizing the transactional data storage engine, such as implementing backup mechanisms and other redundancy mechanisms to protect data. For storage engines implementing selectable storage endpoints, the storage engine itself may be configured to ensure that consistent and redundant copies of data are maintained.

Figure 1:
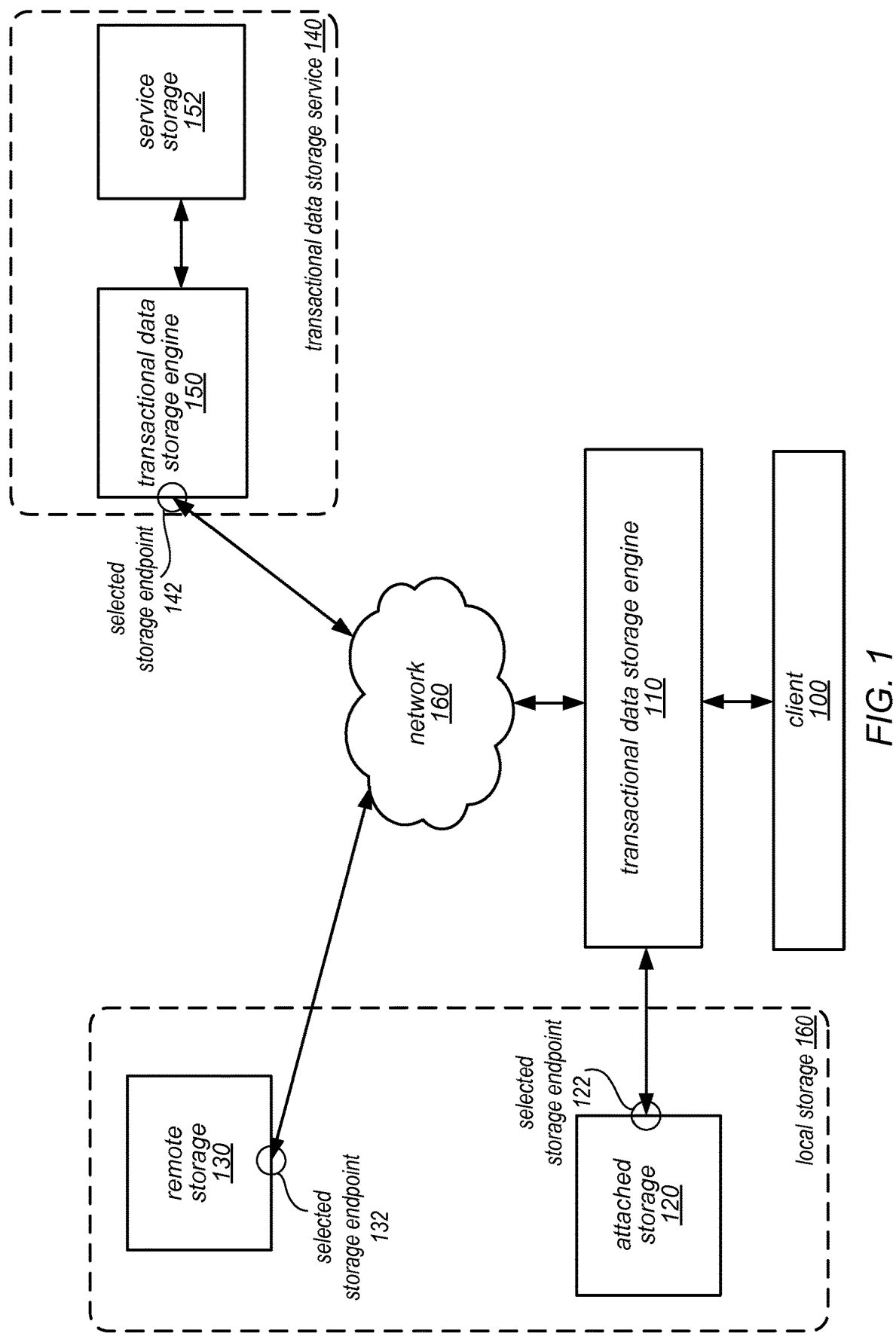
FIG. 1 is a block diagram illustrating selected storage endpoints for a transactional data storage engine, according to some embodiments.

FIG. 1 is a block diagram illustrating selected storage endpoints for a transactional data storage engine, according to some embodiments. Transactional data storage engine 110 may manage data on behalf of client 100. Various updates and other access requests to data managed by transactional data storage engine 100 may be performed in such a way as to be strongly or eventually consistent across various replicas or copies of the data. In various embodiments, transactional data storage engine may be embedded as part of client 100 (embedded in an application) or accessible to client 100 via various communication protocols or technologies (e.g., via a network). Client 100 may be implemented as part of various different systems, components or devices, such as computer system 1000 described below in FIG. 9.

Client 100 may be a system, component, or application, configured, in various embodiments, to select storage endpoints for transactional data storage engine 110. Selected storage endpoints may identify a storage location for a replica of data that is maintained for the client 100 such that data maintained at the storage location may be managed by transactional data storage engine 110. For example, a storage endpoint may identify a particular storage device, such as attached storage 120, remote storage 130, or service storage 152. Storage endpoints may provide for flexible and diverse storage locations, configurations and schemes. By selecting and providing storage endpoints to transactional data storage engine 110, transactional data storage engine 110 may service access requests utilizing multiple different storage locations, without implementing multiple separate transactional data storage engines for each identified storage location. Moreover, transactional data storage engine 110 may manage the replicas of data, ensuring durability and consistency, instead of an application such as client 100. Transactional data storage engine 110 may write to and/or read from the multiple different storage endpoints to manage data in way that is flexible to the storage needs of various different clients 100, whether testing or developing applications to utilize transactional data engine 110 on a large scale (e.g., as part of a transactional data storage service), or providing diverse storage locations that blend the utilization of local storage, such as directly attached, on-premise, and/or other network-based storage options.

As illustrated in FIG. 1, selected storage endpoint 122 identifies attached storage 120 as maintaining a replica of data for client 100. Attached storage 120 may, in various embodiments, be a local persistent, block-based storage device (e.g., hard disk drive (HDD), solid state drive (SSD), or other persistent storage technology which may be locally accessible to a system implementing transactional data storage engine 110. For example, a developer utilizing transactional data storage engine 110 may select as a storage endpoint, the laptop hard drive upon which the transactional data storage engine 110 is currently operating.

As illustrated in FIG. 1, selected storage endpoint 132 may identify remote storage 130 as a storage location for a replica of data maintained for client 100 and managed by transactional data storage engine 110. For example, remote storage 130 may be a local area network storage drive (accessible via local network connection to transactional data storage engine 110). In some embodiments, remote storage 130 may be on premise storage devices, networks, servers, or other storage resources that provide data storages within a same network as transactional storage engine 110. In some embodiments, transactional data storage engine may utilize network 160 (which may represent a public or private network to access remote storage 130. In at least some embodiments, neither attached storage 120 nor remote storage 130 may have a separate data storage engine to serve as a storage location for transactional data storage engine 110.

FIG. 1 illustrates that both attached storage 120 and remote storage 130 may be considered local storage 160 for transactional data storage engine 110. For example, remote storage 130 may serve as a primary or secondary replica for transactional data storage engine 110 that is implemented as part a local or private network (e.g., on premise) for servicing access requests to the data managed by transactional data storage engine 110. Generally, local storage 160 may be any type of data storage accessible to a transactional data storage engine that is operated by a common organization or entity.

As illustrated in FIG. 1, selected storage endpoint 142 may identify storage provided by another cloud or network-based storage service, such as transactional data storage service 140. The selected storage endpoint 142 may allow access to transactional data storage engine 150 via network 160 to transactional data storage engine 110 to update and/or otherwise access a replica of data maintained at service stage 152 for client 100. For example, in various embodiments the network-based storage identified at selected storage endpoint 142 may provide eventually consistent storage for servicing access requests. For example, for read requests that do not require the most recent consistent version of the replica of data may be sent to storage endpoint 142 to be processed by transactional data storage engine 150 to access the data maintained at service storage 152. In some embodiments, selected endpoint 142 may point to what appears to be a single replica of the data (e.g., from client 100's perspective) maintained as part of transactional data storage service 150, which may be replicated among multiple different storage locations as part of data redundancy provided by the transactional data storage service 150. Selected storage endpoints, like storage endpoint 142 may allow transactional storage engine 150 to utilize service storage 152 as a backup replica of the data for servicing access requests in the event of a storage failure in local storage 160. The storage configuration information for transactional data storage engine 110 may, for instance, be modified to identify storage endpoint 142 as strongly consistent and direct access requests to endpoint 142 as a primary replica. The modification may be performed, in some embodiments, without client 110 performing any other recovery operations or changes to manage replicas of the data.

As discussed below with regard to FIGS. 2-8, selected storage endpoints may be used to access data maintained by transactional data storage engine 110. For example, updates to data may be replicated across the different storage locations identified by endpoints 122, 132, and 142. In some embodiments, storage endpoints may be identified as strongly consistent or eventually consistent. Strongly consistent storage endpoints may be consistent for servicing read requests for data such that all updates prior to the read request are included in the replica of data at the storage endpoint, whereas eventually consistent storage endpoints may service read requests at storage endpoints where the replica of data may not include every successful update to the data (but the replica of data may still be a prior consistent version of the data). Further examples of configuring and modifying the configuration of selected storage endpoints are discussed below.

This specification begins with a general description of a transactional storage engine. Then various examples of a storage service, which may implement a similar transactional storage engine, are discussed, including different components/modules, or arrangements of components/module, that may be employed as part of implementing the storage service. A number of different methods and techniques to implement selectable storage endpoints for a transactional data storage engine are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
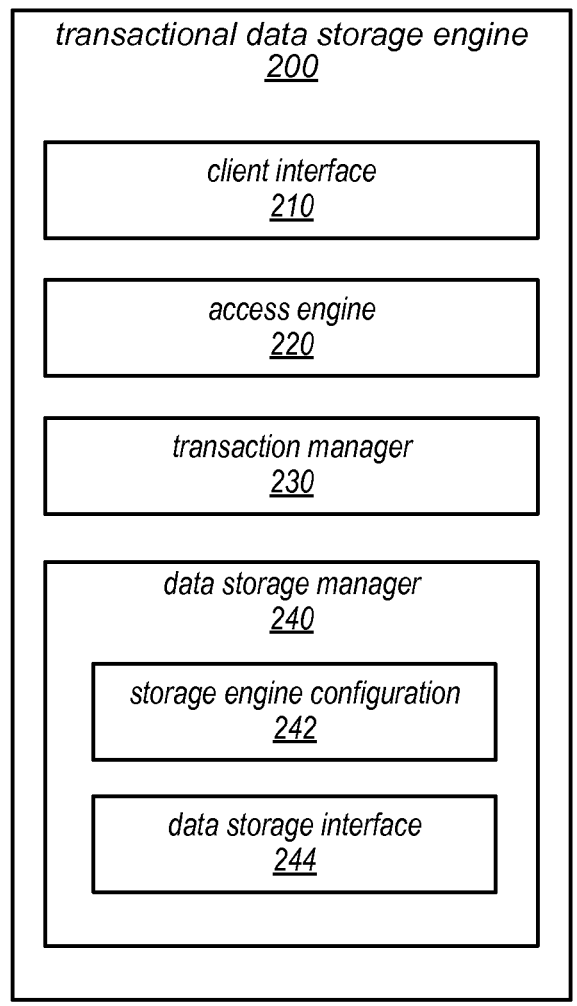
FIG. 2 is a block diagram illustrating a transactional data storage engine, according to some embodiments.

FIG. 2 is a block diagram illustrating a transactional data storage engine, according to some embodiments. Transactional data storage engines may be implemented in a variety of different ways. In some embodiments, transactional data storage engines may manage or implement a relational database or a NoSQL database. Various other types of storage systems may also be implemented which allow eventual consistency across storage locations maintaining replicas of data for the storage engine (e.g., graph database systems or geospatial database systems).

Storage engine 200 may implement client interface 210, in some embodiments. Client interface 210 may provide the interface via which client applications, systems, components, or devices may utilize transactional data storage engine 200. Transactional data storage engine 200 may implement access engine 220 to perform the various access requests to the identified storage endpoints. Access engine 220 may be configured to access underlying data storage (at the storage location identified at the storage endpoints) according to various data models.

In at least some embodiments, the data model may store data for clients of transactional data storage engine 200 in tables containing items that have one or more attributes. The data model may be implemented in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

Transaction manager 230 may be implemented in order to ensure that consistency is provided for updates and/or other access requests to the data maintained for transactional data storage engine 200. For example, transaction manager 230 may implement various locking mechanisms, multi-version mechanisms or other versions of concurrency control. In some embodiments, for example using the data model described above, updates may be implemented atomically by only allowing updates at the table level. Transaction manager 230 may, in some embodiments, ensure that updates sent to strongly consistent selected storage endpoints are acknowledged, prior to identifying the updates as durable (such as described below with regard to FIG. 6).

In at least some embodiments, transactional data storage engine may implement data storage manager 240. Data storage manager 240 may manage, update, and/or otherwise assume responsibility for storage engine configuration information 242, which may include the selected storage endpoints, as well as the various information maintained that describe the storage endpoints and/or interactions with the storage endpoints (strongly consistent, eventually consistent, handles specific access requests, etc.). Data storage manager 240 may implement data storage interface 244 which may be configured to interact with and/or formulate requests for the various storage endpoints. For example, a various drivers or modules configured to communicate with specific systems or services, such as transactional data storage service 330 described below in FIG. 3, may be implemented, as well as various standard storage protocols, such as small computer system interface (SCSI) or Internet SCSI (iSCSI).

Figure 3:
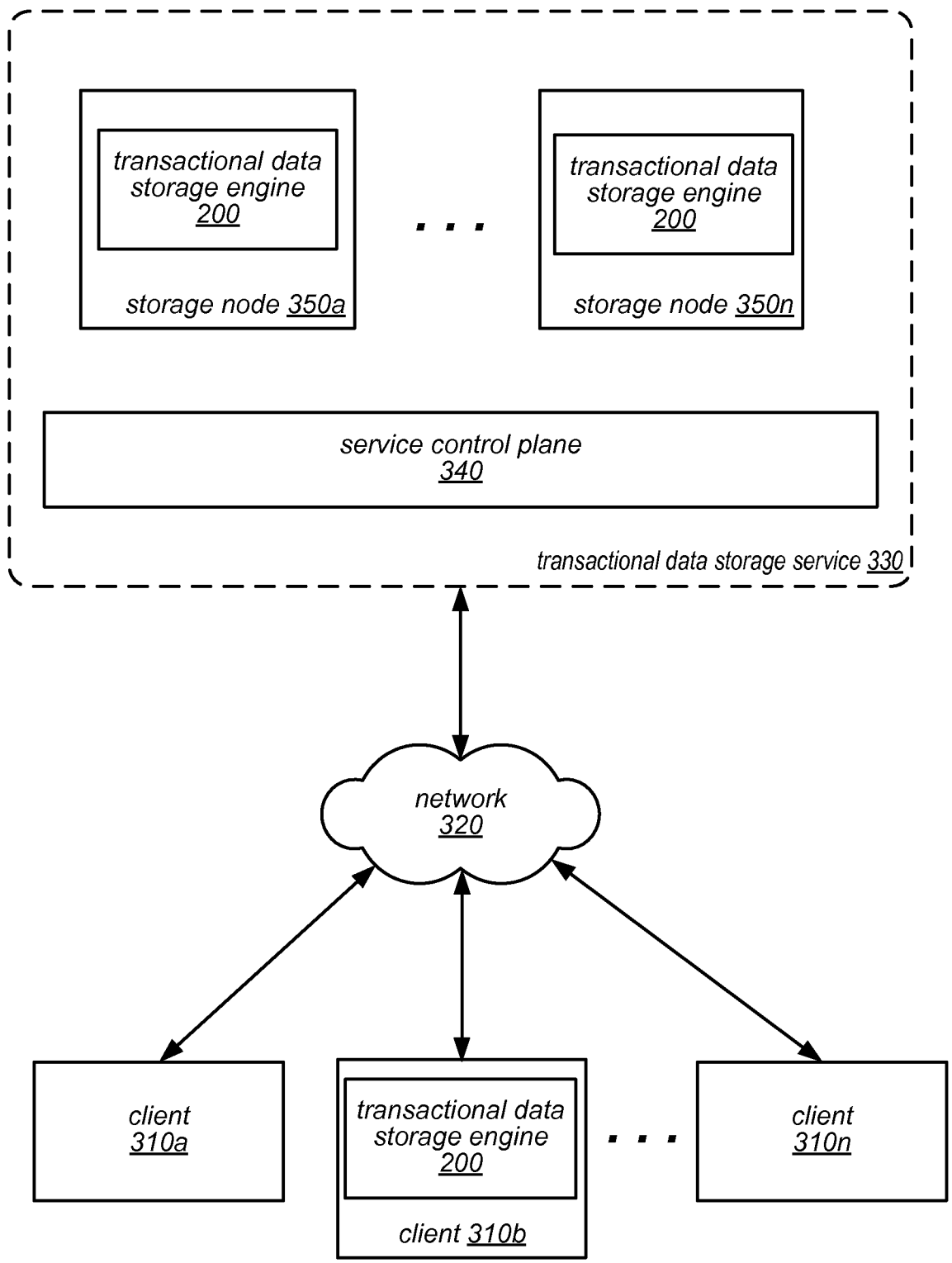
FIG. 3 is a block diagram illustrating a transactional data storage service, according to some embodiments.

FIG. 3 is a block diagram illustrating a transactional data storage service, according to some embodiments. The storage nodes 350 of transactional data storage service 330 may service as storage locations identified by storage endpoints, in some embodiments. In some embodiments, the storage nodes may themselves implement transactional data storage engines 200 which may perform the various techniques described below with regard to FIGS. 4-8. Please note that where one or more instances of a given component may exist, reference to that component herein below may be made in either the singular or the plural. However, usage of either form is not intended to preclude the other. In various embodiments, the components illustrated in FIG. 3 (or any other figure) may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 9 described below. In various embodiments, the functionality of a given storage service system component may be implemented by a particular computing node or may be distributed across several computing nodes. In some embodiments, a given computing node may implement the functionality of more than one storage service system component.

Generally speaking, clients 310a-310n may encompass any type of client configurable to submit web services requests to transactional data storage service 330 via network 320. For example, a given client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by transactional data storage service 330. Alternatively, a storage service client 310 may encompass an application such as transactional data storage engine 200 illustrated at client 310b (discussed above with regard to FIG. 2), media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with transactional data storage service 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to transactional data storage service 330 to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to transactional data storage service 330 may be coordinated by client 310 and the operating system or file system on behalf of applications executing within the operating system environment.

Storage service clients 310 may convey web services requests to and receive responses from transactional data storage service 330 via network 320. In various embodiments, network 320 may encompass any suitable combination of networking hardware and protocols necessary to establish web-based communications between clients 310 and transactional data storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and transactional data storage service 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and transactional data storage service 330. It is noted that in some embodiments, storage service clients 310 may communicate with transactional data storage service 330 using a private network rather than the public Internet. For example, clients 310 may be provisioned within the same enterprise as the data storage service (and/or the underlying system) described herein. In such a case, clients 310 may communicate with transactional data storage service 330 entirely through a private network 320 (e.g., a LAN or WAN that may use Internet-based communication protocols but which is not publicly accessible).

Generally speaking, transactional data storage service 330 may be configured to implement one or more service endpoints (which may be a selected storage endpoint as discussed above) configured to receive and process web services requests, such as requests to access tables maintained on behalf of clients/users by a database service or a data storage service, and/or the items and attributes stored in those tables. For example, transactional data storage service 330 may include hardware and/or software configured to implement various service endpoints and to properly receive and process HTTP-based web services requests directed to those endpoints. In one embodiment, transactional data storage service 330 may be implemented as a server system configured to receive web services requests from clients 310 and to forward them to various components that collectively implement a data storage system for processing. In other embodiments, transactional data storage service 330 may be configured as a number of distinct systems (e.g., in a cluster topology) implementing load balancing and other request management features configured to dynamically manage large-scale web services request processing loads.

As illustrated in FIG. 3, transactional data storage service 330 may include a service control plane 340 which may be configured to receive, authenticate, parse, throttle and/or dispatch service requests, among other things, and provide administrative components (which may be configured to provide a variety of visibility and/or control functions, as described in more detail herein), and a plurality of storage node instances (shown as 350a-350n), each of which may maintain and manage one or more tables on behalf of clients/users or on behalf of the data storage service (and its underlying system) itself implementing transactional data storage engines 200 (as discussed above in FIG. 2). Some of the functionality provided by each of these types of components is described in more detail herein, according to various embodiments. Note that in some embodiments, transactional data storage service 330 may include different versions of some of the components illustrated in FIG. 3 to provide functionality for creating, accessing, and/or managing tables maintained in database instances within a single-tenant environment than those that provide functionality for creating, accessing, and/or managing data (e.g., tables) maintained in storage instances within a multi-tenant environment. In other embodiments, functionality to support both multi-tenant and single-tenant environments may be included in any or all of the components illustrated in FIG. 3. Note also that in various embodiments, one or more storage instances may be implemented on each of the storage nodes 350a-350n, and each may store data on behalf of clients. Some of these storage instances may operate as if they were in a multi-tenant environment, and others may operate as if they were in a single-tenant environment. In some embodiments, storage instances that operate as in a multi-tenant environment may be implemented on different computing nodes (or on different virtual machines executing on a single computing node) than storage instances that operate as in a single-tenant environment.

In various embodiments, transactional data storage service 330 may be configured to support different types of web services requests. For example, in some embodiments, transactional data storage service 330 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments transactional data storage service 330 may implement various client management features in service control plane 340. For example, transactional data storage service 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Transactional data storage service 330 may also implement financial accounting and billing systems, or may maintain a database of usage data that may be queried and processed by external systems for reporting and billing of client usage activity. In some embodiments, transactional data storage service 330 may include a lock manager and/or a bootstrap configuration.

In various embodiments, the data storage service 330 described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, transactional data storage service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by transactional data storage service 330. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

Storage nodes 350 may, in some embodiments, implement transactional data storage engines, such as transactional data storage engines 200 discussed above in FIG. 2. In this way storage nodes may act as storage locations for storage endpoints, as described above in FIG. 1 and FIGS. 4-8, or implement selectable storage endpoints themselves, in some embodiments, (e.g., relying upon a storage location that is external to transactional data storage service 330, such as may be implemented upon a client 310 or other accessible storage system). Storage nodes 350 may also implement various capabilities to perform partition management or to implement replication and failover processes.

Different storage nodes may implement or maintain resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master (or primary) node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc. In some embodiments, replica group members may be implemented as storage endpoints.

The transactional data storage services 330 described herein (and/or the underlying system) may provide an application programming interface (API) for requesting various operations targeting tables, items, and/or attributes maintained on behalf of storage service clients. In some embodiments, the service (and/or the underlying system) may provide both control plane 340 APIs and data plane (e.g., storage nodes 350) APIs. The control plane 340 APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane 340 APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Figure 4:
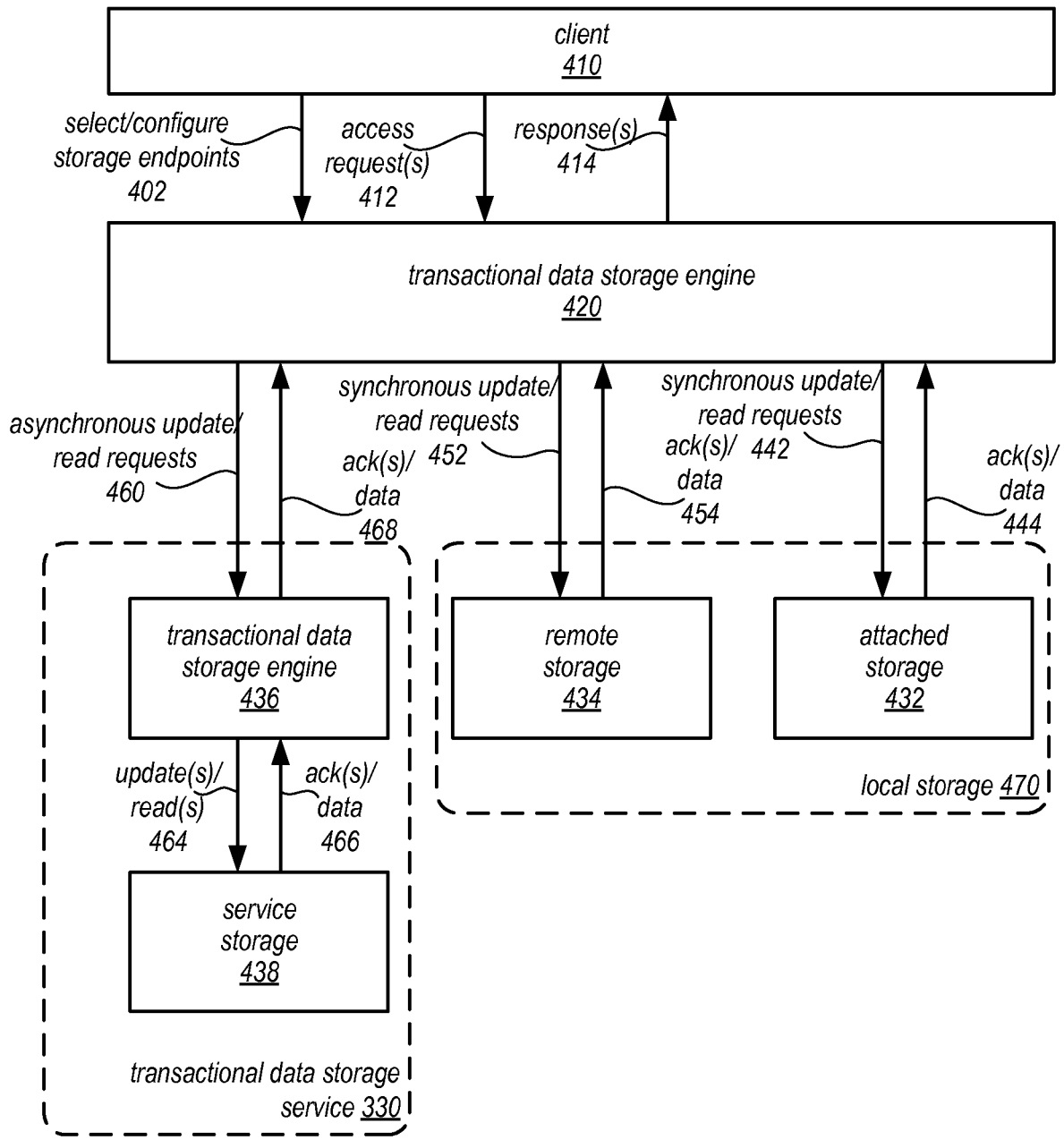
FIG. 4 is a block diagrams illustrating various interactions between a client, transactional data storage engine and storage locations identified by selected storage endpoints, according to some embodiments.

FIG. 4 is a block diagrams illustrating various interactions between a client, transactional data storage engine and storage locations identified by selected storage endpoints, according to some embodiments. As noted above, client 410 may be implemented in various ways. For example client 410 may be an application that embeds transactional data storage engine 420 as part of the application, and thus may submit various requests to transactional data storage engine 420 according to an API. Alternatively, client 410 may be remote or subject to communication with transactional data storage engine 420 over a network (e.g., the Internet) and send various request formatted according to standard and/or customized protocols or interfaces.

Client 410 may send selections of storage endpoints and configuration of storage endpoints 402 to transactional data storage engine 420. Identifiers for the storage endpoints, as well as the various settings, instructions, configurations or modifications to information describing storage endpoints (asynchronous/synchronous, special access credentials, etc.) may be included. Client 410 may also send various types of access requests 412 to transactional data storage engine 420, and as a result of such requests may receive various responses. For example, an update may be sent 442 to attached storage 432 synchronously. Attached storage 432 (e.g., attached storage device) may be identified as a strongly consistent storage endpoint, and thus transactional data storage engine 420 may wait to receive an ack 444 from local storage 432 before sending a response 414. The update may also be sent 452 to remote storage 434 synchronously. Remote storage 434 (e.g., networked-storage device) may also be identified as a strongly consistent storage endpoint, and thus transactional data storage engine 420 may wait to receive an ack 454 from remote storage 434 before sending a response 414. As noted above, attached storage endpoint 432 and remote storage endpoint 434 may be local storage 470, in some embodiments. In some embodiments, updates may be sent 460 to another transactional data storage engine 436 (which may be similar to transactional data storage engine 420) to perform the update 464 with respect to storage 438 local to the transactional data storage engine 436 (e.g., implemented on a same storage node as part of a storage service, such as described above in FIG. 3). The storage endpoint identifying transactional data storage engine 436 may be eventually consistent, and thus transactional data storage engine 420 may send a response 414 without waiting for ack(s) 466 and 468. Read requests may be processed in similar ways (although read requests may be only directed to a particular storage endpoint based on the storage endpoint, such as whether storage endpoint is a strongly consistent or eventually consistent storage endpoint).

Figure 5:
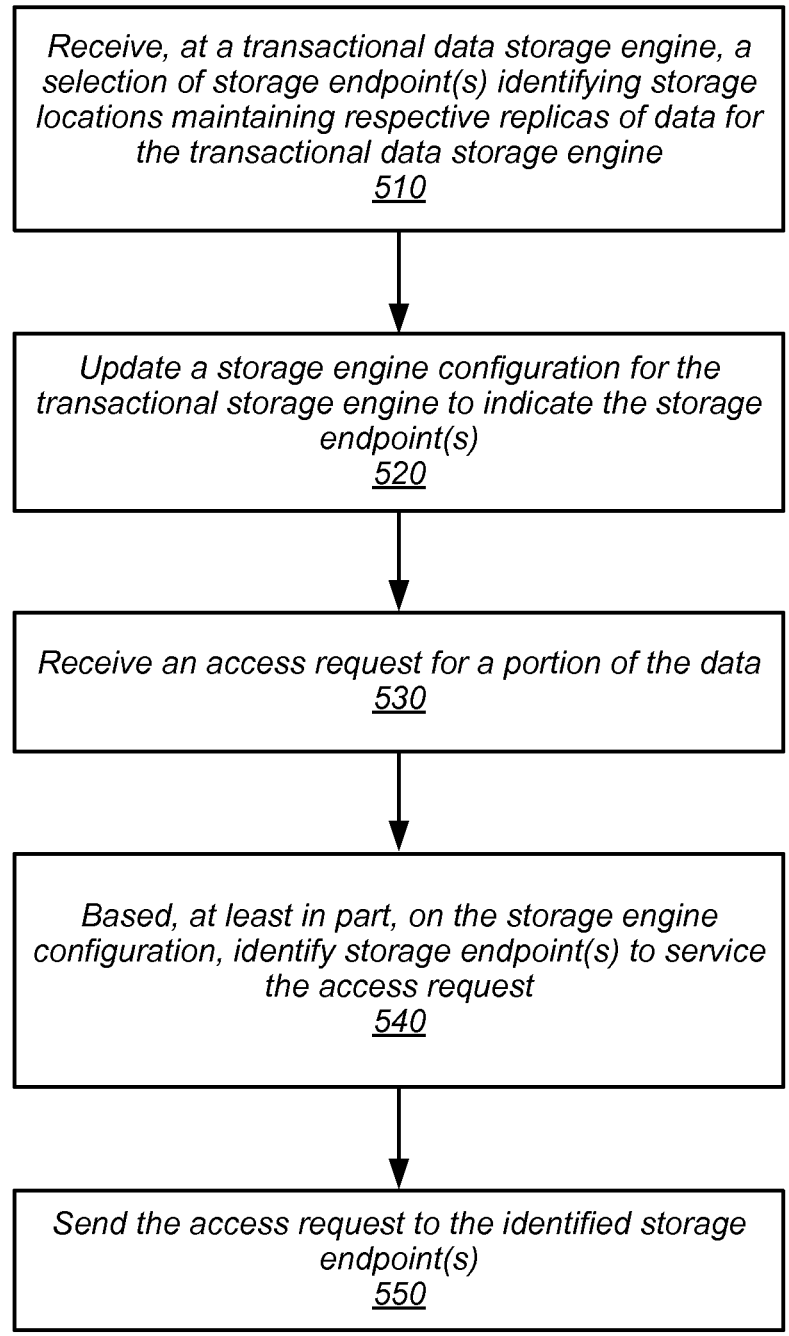
FIG. 5 is a high-level flowchart of various methods and techniques to implement selectable storage endpoints for a transactional database engine, according to some embodiments.

Transactional data storage engines may be implemented as a part of, or configured to interact with many different systems, such as various clients, storage nodes, systems, devices or services, as described above with regard to FIGS. 2-4. Various other types or configurations of transactional data storage engines may implement these techniques, which may or may not be offered as part of a network-based service. For example, a variety of different components, systems or applications may implement a transactional data storage engine, such as various components that implement reporting of data metrics (e.g., household sensors for heating and cooling, appliances, security systems, etc. . . . ) or applications implemented on mobile computing devices, such as various types of mobile phones, laptops, tablet computers, or any other portable computing device which may utilize a transactional data storage engine to manage or manipulate stored data. Different types of transactional data storage engines, such as relational database engines, NOSQL database engines, or any other type of engine that may provide eventual consistency across different storage locations. FIG. 5 is a high-level flowchart of various methods and techniques to implement selectable storage endpoints for a transactional database engine, according to some embodiments. These techniques, as well as the techniques discussed below with regard to FIGS. 6-8, may be implemented using various components of the examples listed above, or as discussed above with regard to FIGS. 1-4, or any other computing device implementing a transactional data storage engine.

As indicated at 510, a selection of storage endpoints may be received at a transactional data storage engine, in various embodiments. The selected storage endpoints may identify storage locations maintaining respective replicas of data for the transactional data storage engine, in some embodiments. Storage endpoints may be represented in different ways. For example a storage endpoint may indicate a locally attached persistent storage device, which may be block-based, such as hard disk drive (HDD) or a solid state drive (SSD), and provide the file system path or other information to provide the storage location of a replica of the data. In at least some embodiments, a storage endpoint may represent a remote storage device accessed via a network, such as network-attached or mounted storage drive, or storage devices of a Storage Area Network (SAN) or other storage system technology. In some embodiments, a storage endpoint may represent a network address or location of storage implemented as part of a storage service or system. Such network-based storage may be cloud-based or otherwise accessible via public and/or private networks to a transactional data storage engine, in some embodiments. Service or system access credentials may be included in a storage endpoint which may be used to access the network-based storage.

Figure 6:
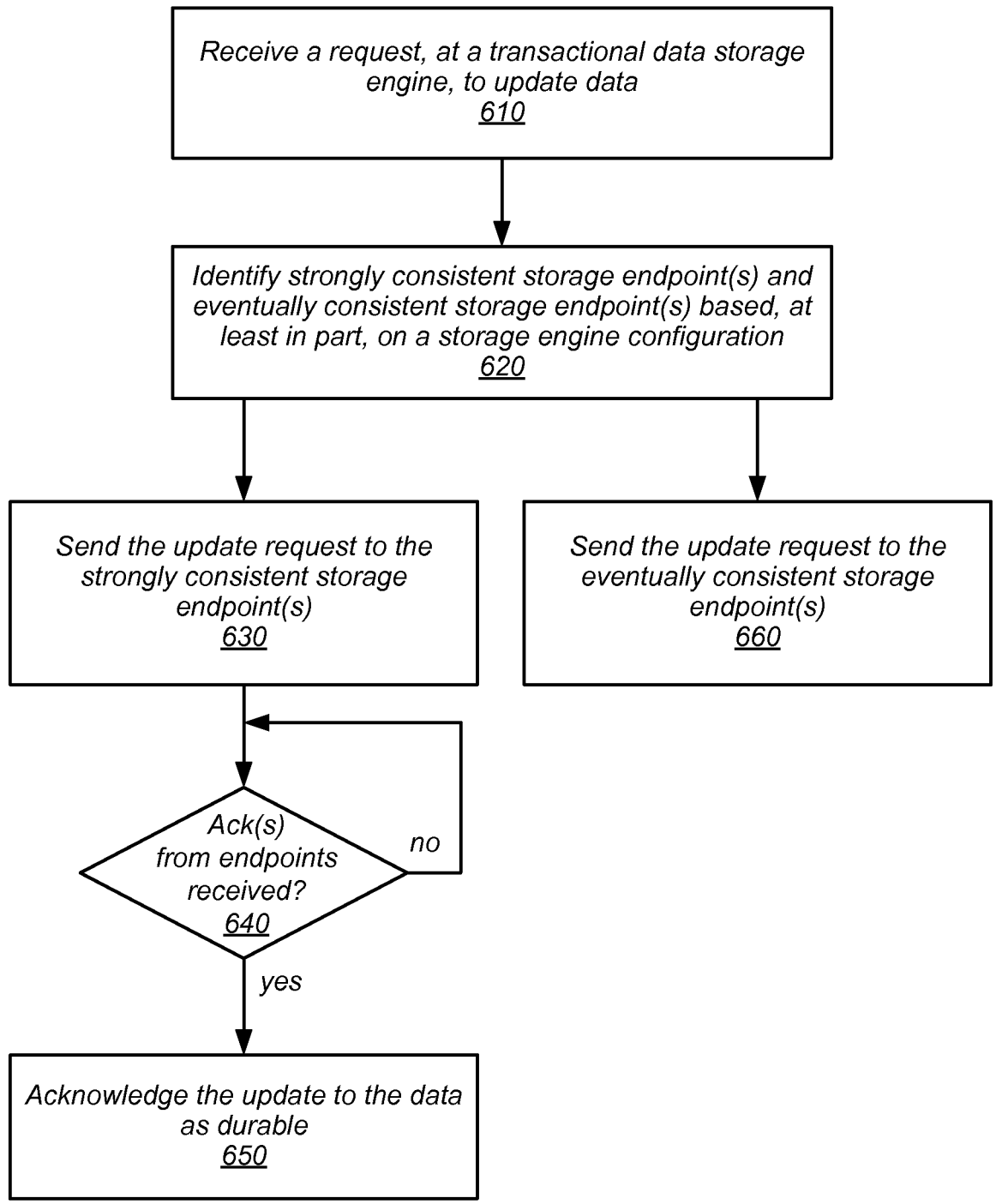
FIG. 6 is a high-level flowchart of various methods and techniques to service an update request at a transactional data storage engine implementing selectable storage endpoints, according to some embodiments.

The selection of storage endpoints may include, in various embodiments, information describing the processing of access operations at the storage location of the storage endpoint with regard to the transactional data storage engine, in at least some embodiments. For example, in some embodiments, the selection may indicate whether the replica of data maintained at the storage location is strongly consistent or eventually consistent. For strongly consistent storage endpoints, a transactional data storage engine may be configured to wait (and there implement synchronous processing) for updates sent to the strongly consistent storage endpoint to be acknowledged before continuing processing of the update (e.g., acknowledging as durable). FIG. 6, discussed below, provides further discussion of synchronous processing for updates. For eventually consistent storage endpoints, a transactional data storage engine may not be configured to wait for an acknowledgment prior to continuing processing of the update request. Selection of storage endpoints may also indicate certain portions of data which may be particular to certain storage locations (which may be an exception to eventual consistency expectations for the transactional data storage engine noted above), as well as specify the processing of certain types of access requests (e.g., reads for certain data) to certain storage locations. In some embodiments, selection of storage endpoints may indicate the amount of time before updates are sent to the eventually consistent storage endpoints.

As indicated at 520, a storage engine configuration for the transactional storage engine may be updated to indicate the storage endpoint(s), in various embodiments. For example, various types of metadata, mapping information, schemas, policies and/or other information regarding the locations of, and interactions with, storage endpoints may be modified. In various embodiments, the storage configuration information, including the storage endpoints may be modified after initial selection. For example, a storage endpoint designated as eventually consistent may be switched to strongly consistent. Consider the scenario where an eventually consistent storage endpoint identifies a network-based storage location (e.g., as part of a network-based storage service as illustrated in FIG. 3). It may be beneficial to change the eventually consistent storage location to a scalable, durable and available storage solution so that the network-based storage location may serve as the primary storage location for the transactional data storage engine (e.g., when switching from a development application that utilizes the transactional data storage engine to a production version of the application, switching from the small local storage to high performance and available service storage). Changes or modifications to storage engine configuration information may be immediately applicable or subject to a schedule or time effective, in various embodiments. For instance, a modification of the storage engine configuration that redirects read request traffic to a different storage endpoint may be performed at a scheduled time (e.g., 12:00 a.m.).

Access requests for data maintained for the transactional data storage engine may be received and processed according to the storage engine configuration and selected storage endpoints, in various embodiments. As indicated at 530, an access request may be received for a portion of a data. For example a request to read a portion of data or update a portion of data (as discussed below in FIGS. 6 and 7) may be received. Based, at least in part, on the storage configuration information, storage endpoints may be identified to service the access request, as indicated at 540. For example, storage endpoints for servicing certain types of read requests (e.g., strongly consistent or eventually consistent) may be received. The access request may then be sent to the identified storage endpoint(s), as indicated at 550, for servicing of the access request, in various embodiments. For example, requested data may be obtained and returned for subsequent processing and or transfer to a client of transactional data storage engine.

One example of an access request for data maintained for a transactional data storage engine is an update request. FIG. 6 is a high-level flowchart of various methods and techniques to service an update request at a transactional data storage engine implementing selectable storage endpoints, according to some embodiments. As indicated at 610, a request to update data at a transactional data storage engine may be received. An update request may be formatted according to various well-known or widely available protocols, such as an "INSERT" statement formatted according to Structured Query Language (SQL) or HTTP format "PUT," or the request may be formatted according to a programmatic interface (API) specific to the transactional data storage engine.

As indicated at 620, strongly consistent storage endpoint (s) and eventually consistent storage endpoint(s) may be identified based, at least in part, on a storage engine configuration, in various embodiments. The update request may be sent to the strongly consistent storage endpoint(s), as indicated at 630. In some embodiments, strongly consistent storage endpoints may be selected for storage locations that are local to the transactional data storage engine, or may be optimized to provide faster write performance. In some embodiments, eventually consistent storage endpoints may be selected as local for development or test purposes (with asynchronous storage endpoints selected provide eventually consistent copies in another storage location). As indicated at 640, forward processing for the update request at the transactional data storage engine may be paused until acknowledgments of the update request are received from each of the storage locations of the strongly consistent storage endpoints. If the acknowledgments are received, then the update to the data may be considered durable, as indicated at 650. Alternatively, acknowledgments for update requests that are sent to the asynchronous storage endpoints, as indicated at 660, may not be received prior to acknowledging the update as durable. Note, however, that acknowledgments of the update may still be eventually received. If not, in some embodiments, the update requests may be retried or other update failure processing techniques triggered.

Figure 7:
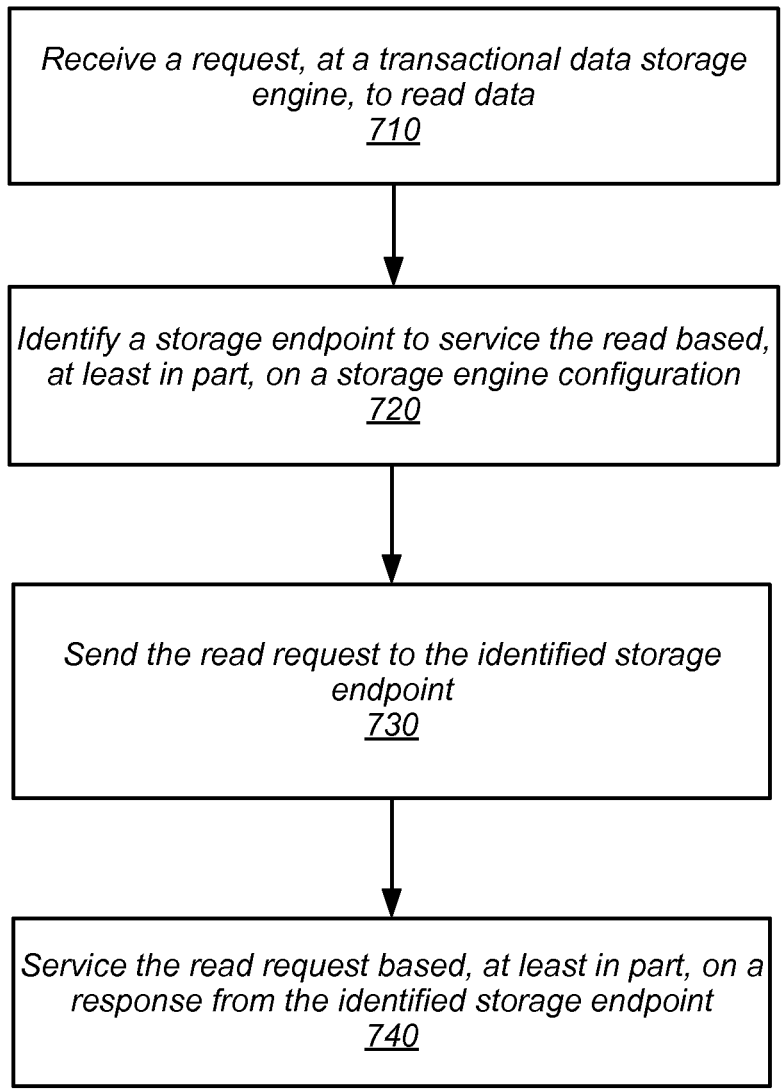
FIG. 7 is a high-level flowchart of various methods and techniques to service a read request at a transactional data storage engine implementing selectable storage endpoints, according to some embodiments.

Another example of an access request for data maintained for a transactional data storage engine is a read request. FIG. 7 is a high-level flowchart of various methods and techniques to service a read request at a transactional data storage engine implementing selectable storage endpoints, according to some embodiments. As indicated at 710, a read request may be received, at a transactional data storage engine, to read, at least some of, the data maintained for the transactional data storage engine. The read request may be formatted according to various well-known or widely available protocols, such as a "SELECT" statement formatted according to Structured Query Language (SQL) or HTTP format "GET," or the request may be formatted according to a programmatic interface (API) specific to the transactional data storage engine.

As indicated at 720, a storage endpoint to service the read request may be identified based, at least in part, on a storage engine configuration. For example, the storage engine configuration may identify certain types of read requests (e.g., requests for strongly consistent data or eventually consistent data) and determine the storage locations identified by the storage endpoints that provide the data according to the type of read request. A strongly consistent storage endpoint, for example, may provide for strongly consistent reads, in some embodiments, as updates to the replica of data maintained at the storage location are synchronized such that any updates made to the data that were successfully performed prior to the read request are included in the version of the data returned from the storage location. Alternatively, an eventually consistent storage endpoint, may provide data for read requests that is eventually consistent, in some embodiments. For instance, a recent update to the data may not be included in a version of data returned in response to the read request, yet no updates which may not be eventually successful may be included in the version of the data. In some embodiments, the storage engine configuration may indicate an architecture or desired operation for servicing read requests. For instance, all read requests may be directed to a storage endpoint for a storage location optimized to quickly service read requests and/or handle large amounts of read requests. As noted earlier, a storage endpoint may provide a storage location that includes multiple replicas of the data, each of which may be individually available to service requests. Thus, the storage engine configuration may identify the storage endpoint for such a storage location in order to take advantage of the higher availability for servicing read requests that a group of replicas may provide, in some embodiments.

The storage engine configuration may also provide or specify access policies or specialized storage locations for certain types of data. For example, in some embodiments, a transactional data storage engine may only replicate certain data to some of the replicas in the storage locations identified by the selected storage endpoints. If, for instance, some storage locations offered higher data security or easier access for clients or applications of the transactional data storage engine that utilized the select data, then the storage engine configuration may identify and/or direct that read requests for such data be sent to the specified storage endpoints that maintain the data. Thus, the storage engine configuration may act, in many ways, as a traffic policy or mapping information for the location of data among storage locations identified by the storage endpoints.

As indicated at 730, the read request may be sent to the identified storage endpoint, in some embodiments. A response, possibly including requested data may be received from the storage endpoint. The request may be serviced based, at least in part, on the response from the storage endpoint, as indicated 740. For example, in at least some embodiments the read request may be included as part of a larger request for data, such as a query for multiple different portions of data. The data from the read request may be included (or excluded) from a response to the query dependent on whether or not the read data satisfies the query conditions.

As discussed above, a storage engine configuration for a transactional data storage engine may indicate the various ways in which the storage nodes, systems, or devices identified by storage endpoints are utilized to service access requests, provide redundancy, improve availability, or otherwise operate in relation to clients and/or the transactional data storage engine. Storage endpoints identified as strongly consistent, for instance, may indicate that the data maintained at these storage locations is such that a read of the data may return a result that includes all previous updates which were successfully made to the data). Changes to the storage engine configuration may affect the operation of the transactional data storage engine and/or the various storage locations identified by the storage endpoints. As noted above in FIGS. 4 and 5, requests to modify the configuration may be made in order to carry out these operational changes, such as the case where a remote storage location (e.g., in a network-based storage service that provides high durability and availability) may be used to service updates and/or reads for data.

Figure 8:
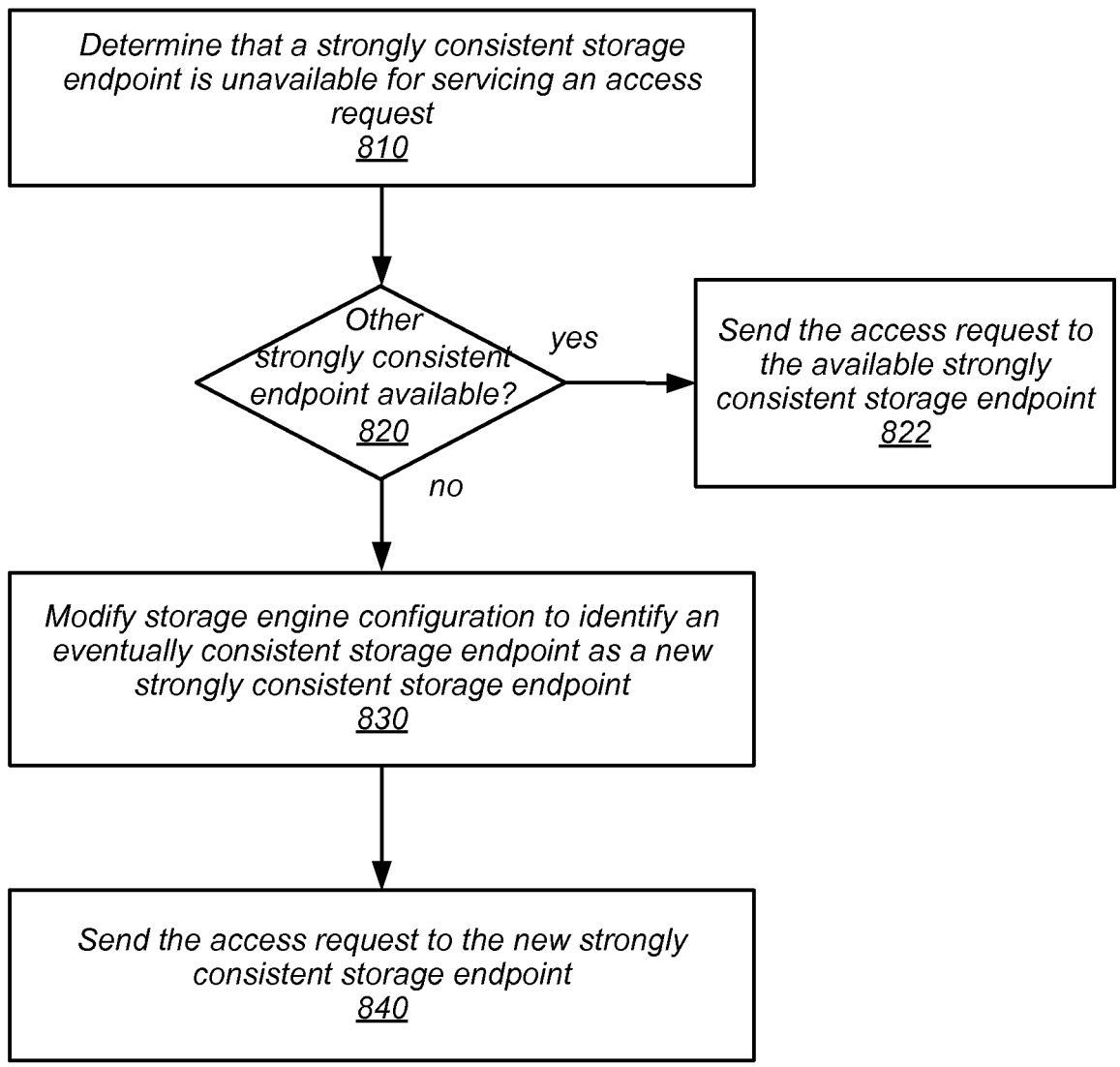
FIG. 8 is a high-level flowchart of various methods and techniques to modify a storage engine configuration at a transactional data storage engine as a result of unavailable storage endpoints, according to some embodiments.

Some changes to the storage engine configuration may be driven by storage failures or other dynamic/reactive scenarios. Network traffic loads, network partitions, power outages, and/or storage device failures are some of many possible failures that may affect whether an identified storage endpoint is able to continue to service access requests (as expected or at all). FIG. 8 is a high-level flowchart of various methods and techniques to modify a storage engine configuration at a transactional data storage engine as a result of unavailable storage endpoints, according to some embodiments. As indicated at 810, in various embodiments, a strongly consistent storage endpoint may be determined to be unavailable for service an access request. An update request, for example, may be sent to the storage endpoint, and after a period of time expire with no response. The storage system, node, or device identified by the strongly consistent storage endpoint may then be determined to be unavailable. In order to make progress and acknowledge the update request, another strongly consistent storage endpoint may need to be identified. As indicated at 820, other strongly consistent storage endpoints may be identified and, if available (as indicated by the positive exit from 820), the access request may be sent to the available strongly consistent storage endpoint, as indicated at 822.

In some embodiments, strongly consistent storage endpoints may be tried for processing the access request until no synchronous storage endpoints remain. As indicated by the negative exit from 820, if no other strongly consistent storage endpoints are available to service the access request, then the storage engine configuration may be modified to identify an eventually storage endpoint as a new synchronous storage endpoint, as indicated at 830, in various embodiments. In some embodiments, such a modification may trigger further notifications and/or processing. For example, if an eventually consistent storage endpoint identified a storage location in a transactional data storage service, such as illustrated above in FIGS. 1 and 3, then a control plane, storage node, and/or other transactional data engine of the service may be notified that update requests and read requests may now be serviced using the storage location in the transactional data service. In at least some embodiments, some updates or changes to the data that may have not yet been performed at the asynchronous replica of the data may be performed/applied prior to servicing access requests. As indicated at 840, the access request may then be sent to the new eventually consistent storage endpoint, in various embodiments, to be serviced.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
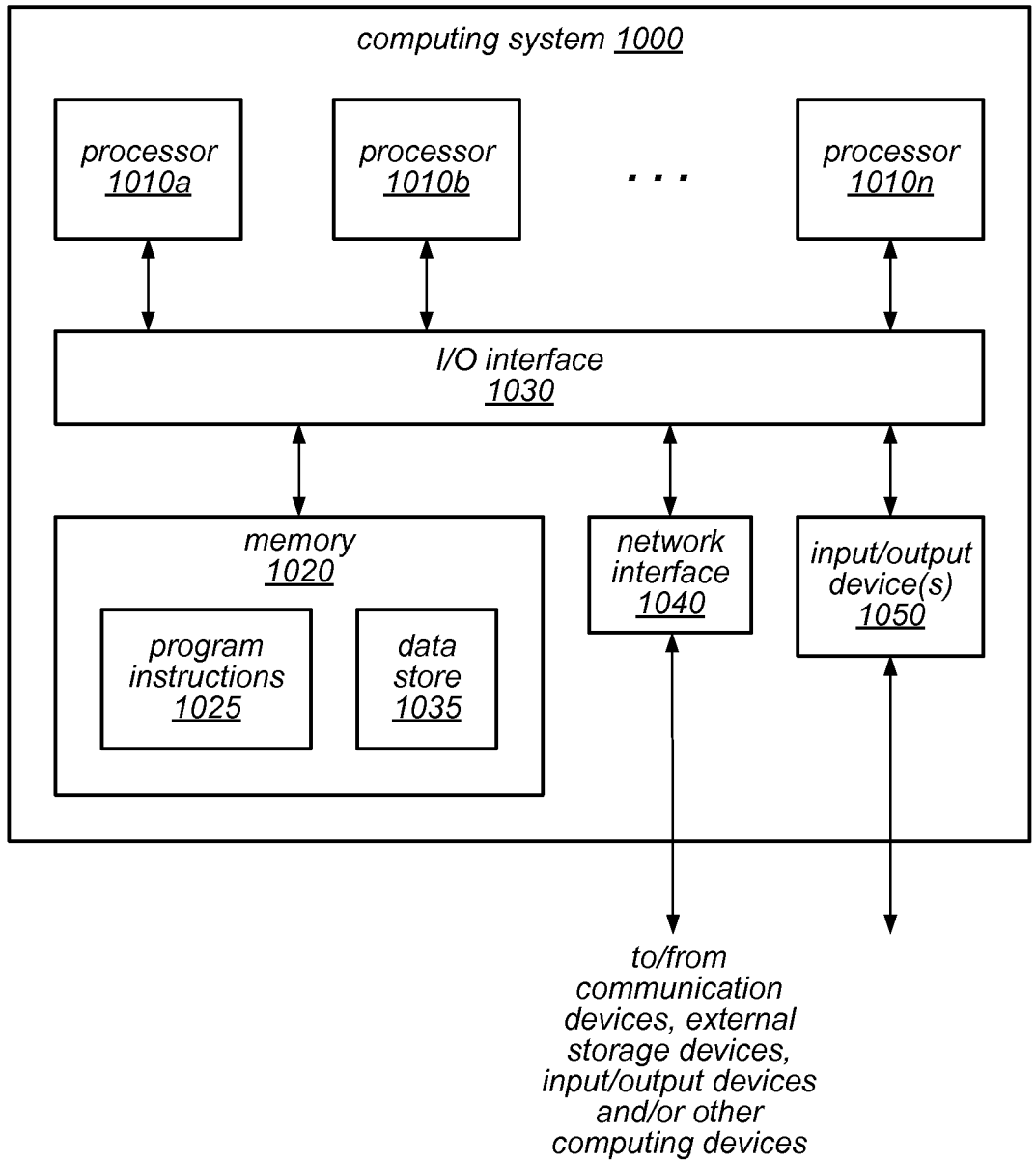
FIG. 9 is a block diagram illustrating an example computing system, according to some embodiments.

Embodiments of selectable storage endpoints for transactional data storage engines as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various embodiments of scheduling and tracking event operations for distributed storage systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a persistent, block-based storage device;
at least one processor;
a memory, comprising program instructions that when executed by the at least one processor cause the at least one processor to implement a transactional data storage engine comprising a storage engine configuration;
the transactional data storage engine, configured to:

receive a selection of a plurality of storage endpoints from a client of the transactional data storage engine identifying storage locations maintaining respective replicas of data for the transactional data storage engine, wherein the received selection of storage endpoints comprises a modification to the storage engine configuration of the transactional data storage engine, wherein the received selection of storage endpoints indicates whether a respective replica is strongly consistent or eventually consistent for at least some of the storage endpoints, wherein one of the plurality of storage endpoints identifies the persistent, block-based storage device, wherein another one of the plurality of storage endpoints identifies a remote persistent data store, wherein the remote persistent data store is implemented as part of a remote system such that in the event of a failure of the persistent, block-based storage device the remote persistent data store is available to service access requests for the data;

in response to the receipt of the selection of the plurality of storage endpoints, update mapping information for the storage engine configuration for the transactional data storage engine to indicate the plurality of storage endpoints and whether the respective replicas are strongly consistent or eventually consistent;

in response to a receipt of an access request for at least a portion of the data:
select at least one storage endpoint from the plurality of storage endpoints to service the access request, wherein the selection of the at least one storage endpoint is based, at least in part, on the updated mapping information and on whether the respective replicas are strongly consistent or eventually consistent; and
send the access request to the selected at least one storage endpoint.

2. The system of claim 1,
wherein the access request is a request to update the portion of the data;
wherein to select the at least one storage endpoint to service the access request, the transactional data storage engine is configured to select one or more strongly consistent storage endpoints; and
wherein the transactional data storage engine is further configured to:
in response to receipt of respective acknowledgments from the one or more strongly consistent storage endpoints, acknowledge the update to the portion of the data as durable.

3. The system of claim 1, wherein the access request is a read request for an eventually consistent version of the portion of the data, and wherein to select the at least one of the one or more storage endpoints to service the access request the transactional data storage engine is configured to select an eventually consistent storage endpoint to send the access request.

4. The system of claim 1, wherein the system is a mobile computing device.

5. A method, comprising:
performing, by one or more computing devices:
receiving, at a transactional data storage engine, a selection of one or more storage endpoints from a client of the transactional data storage engine identifying storage locations maintaining respective replicas of data for the transactional data storage engine, wherein the received selection of storage endpoints comprises a modification to a storage engine configuration of the transactional data storage engine, wherein the received selection of storage endpoints indicates whether a respective replica is strongly consistent or eventually consistent for at least some of the storage endpoints;

in response to receiving the selection of the one or more storage endpoints, updating mapping information for the storage engine configuration for the transactional data storage engine to indicate the one or more storage endpoints and whether the respective replicas are strongly consistent or eventually consistent;

in response to receiving an access request for at least a portion of the data at the transactional data storage engine:
selecting at least one storage endpoint from the one or more storage endpoints to service the access request, wherein the selecting of the at least one storage endpoint is based, at least in part, on the updated mapping information and on whether the respective replicas are strongly consistent or eventually consistent; and
sending the access request to the selected at least one storage endpoint.

6. The method of claim 5, further comprising:
wherein the access request is a request to update the portion of the data;
wherein the selecting the at least one storage endpoint from the one or more storage endpoints to service the access request comprises selecting one or more strongly consistent storage endpoints; and
wherein the method further comprises:
in response to receiving respective acknowledgments from the one or more strongly consistent storage endpoints, acknowledging the update to the portion of the data as durable.

7. The method of claim 6,
wherein the selecting the at least one storage endpoint from the one or more storage endpoints to service the access request comprises selecting one or more eventually consistent storage endpoints to send the access request; and
wherein the acknowledgment of the update as durable is performed without receiving an acknowledgment from at least one of the one or more eventually consistent storage endpoints.

8. The method of claim 5, wherein the access request is a read request for a strongly consistent version of the portion of the data, and wherein the selecting the at least one storage endpoint from the one or more storage endpoints to service the access request comprises selecting a strongly consistent storage endpoint to send the access request.

9. The method of claim 5, wherein the access request is a read request for an eventually consistent version of the portion of the data, and wherein the selecting the at least one storage endpoint from the one or more storage endpoints to service the access request comprises selecting an eventually consistent storage endpoint to send the access request.

10. The method of claim 5, further comprising:
receiving a request to modify a particular one of the one or more storage endpoints from eventually consistent to strongly consistent; and
updating the storage configuration data to indicate the particular storage endpoint is strongly consistent such that a subsequent access request is sent to the particular storage endpoint for processing as eventually consistent.

11. The method of claim 5, wherein the transactional data storage engine implements a relational database engine.

12. The method of claim 5, wherein in selecting the at least one storage endpoint from the one or more storage endpoints to service the access request, the transactional data storage engine further implements:
in response to determining that a strongly consistent storage endpoint of the one or more storage endpoints is unavailable to service the access request, modifying the updated storage engine configuration to select another one of the one or more storage endpoints that is an eventually consistent endpoint as a new strongly consistent storage endpoint, wherein the new strongly consistent storage endpoint is the at least one storage endpoint sent the access request.

13. The method of claim 5, wherein the storage location of the at least one storage endpoint sent the access request is implemented as part of a network-based storage service.

14. A non-transitory, computer-readable storage medium, storing program instructions that when executed by one or more computing devices cause the one or more computing devices to implement a transactional data storage engine, comprising a storage engine configuration, that implements:
receiving, at a transactional data storage engine, a selection of one or more storage endpoints from a client of the transactional data storage engine identifying storage locations maintaining respective replicas of data for the transactional data storage engine, wherein the received selection of one or more storage endpoints comprises a modification to the storage engine configuration of the transactional data storage engine, wherein the received selection of storage endpoints indicates whether a respective replica is strongly consistent or eventually consistent for at least some of the storage endpoints;
in response to receiving the selection of the one or more storage endpoints, updating mapping information for the storage engine configuration for the transactional data storage engine to indicate the one or more storage endpoints and whether the respective replicas are strongly consistent or eventually consistent;
in response to receiving an access request for at least a portion of the data at the transactional data storage engine:
selecting at least one storage endpoint from the one or more storage endpoints to service the access request, wherein the selecting of the at least one storage endpoint is based, at least in part, on the updated mapping information and on whether the respective replicas are strongly consistent or eventually consistent; and
sending the access request to the selected at least one storage endpoint.

15. The non-transitory, computer-readable storage medium of claim 14,
wherein the access request is a request to update the portion of the data;
wherein, in selecting the at least one storage endpoint from the one or more storage endpoints to service the access request, the transactional data storage engine further implements selecting one or more strongly consistent storage endpoints; and
wherein the transactional data storage engine further implements:
in response to receiving respective acknowledgments from the one or more strongly consistent storage endpoints, acknowledging the update to the portion of the data as durable.

16. The non-transitory, computer-readable storage medium of claim 15,
wherein, in selecting the at least one storage endpoint from the one or more storage endpoints to service the access request, the transactional data storage engine further implements selecting one or more eventually consistent storage endpoints to send the access request; and
wherein the acknowledgment of the update as durable is performed without receiving an acknowledgment from at least one of the one or more eventually consistent storage endpoints.

17. The non-transitory, computer-readable storage medium of claim 14, wherein the access request is a request to read the portion of the data, and wherein the at least one selected storage endpoint is an eventually consistent storage endpoint.

18. The non-transitory, computer-readable storage medium of claim 14, wherein the transactional data storage engine is implemented as part of a network-based storage service, and wherein the storage location of the at least one selected storage endpoint is external to the network-based storage service.

19. The non-transitory, computer-readable storage medium of claim 14, wherein, in selecting the at least one storage endpoint from the one or more storage endpoints to service the access request, the transactional data storage engine further implements:
in response to determining that a strongly consistent storage endpoint of the one or more storage endpoints is unavailable to service the access request, modifying the updated storage engine configuration to select another one of the one or more storage endpoints that is an eventually endpoint as a new strongly consistent storage endpoint, wherein the unavailable one or more storage endpoints are implemented as part of local storage, wherein the new synchronous storage endpoint is the at least one storage endpoint sent the access request, and wherein the new strongly consistent storage endpoint is implemented as part of a network-based storage service.

20. The non-transitory, computer-readable storage medium of claim 14, wherein the transactional data storage engine implements a Not Only Structured Query Language (NoSQL) database engine.

* * * * *